Figure 1A:
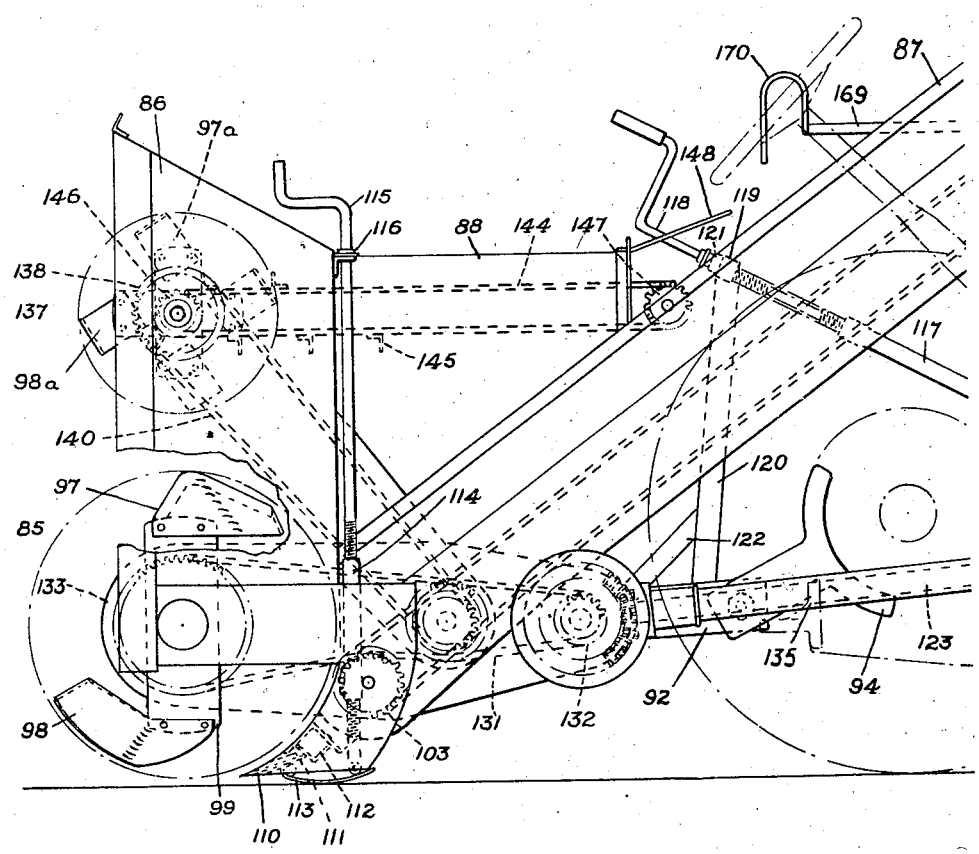

April 19, 1949.  E. N. GRIFFITH ET AL  2,467,619
SOIL AND LIKE CUTTING AND LIFTING MACHINE
Filed Dec. 7, 1944  6 Sheets-Sheet 1

INVENTORS
EDWARD NOEL GRIFFITH AND
ARTHUR CLIFFORD HOWARD

BY Jewitt and Mead
ATTORNEYS

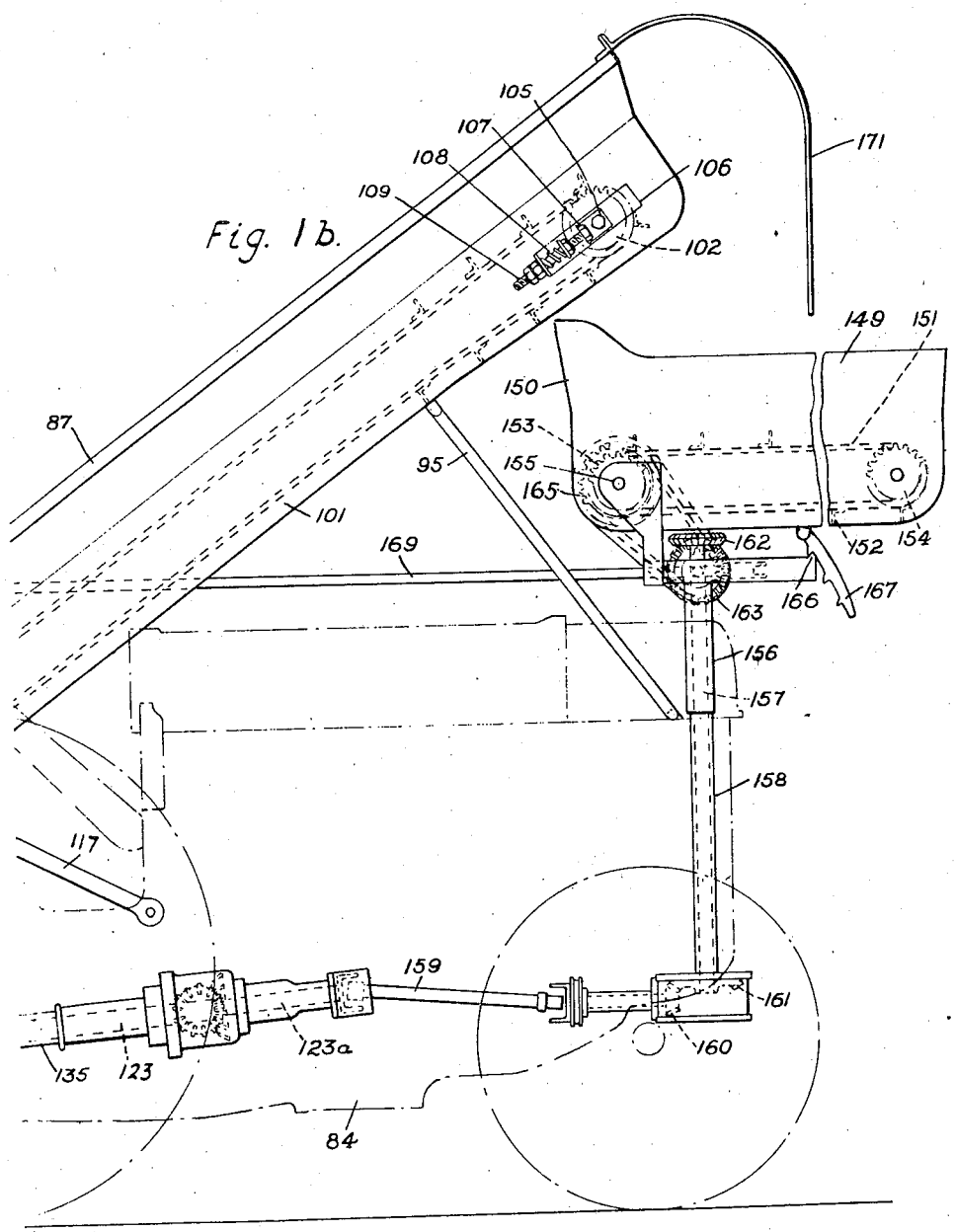

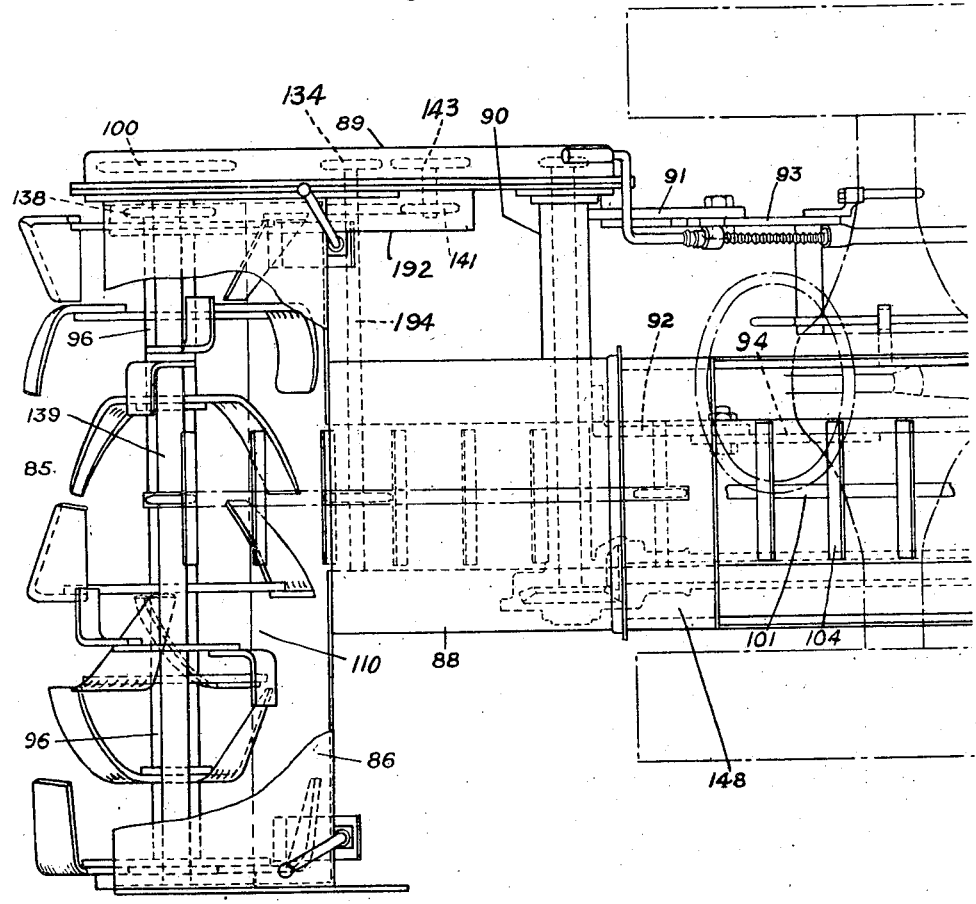

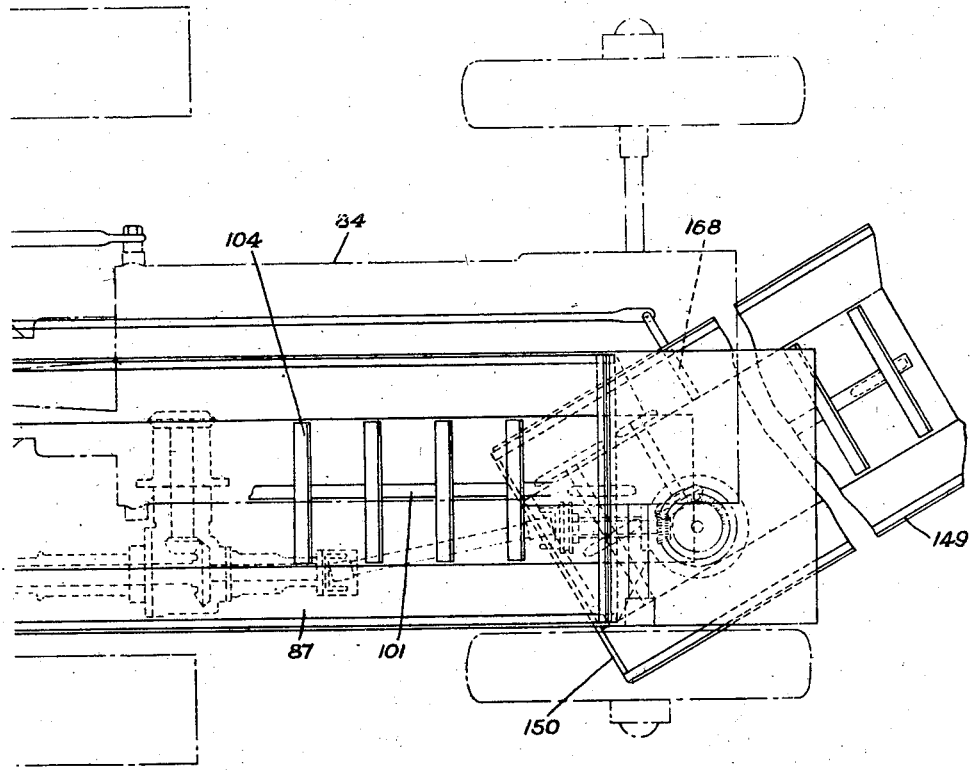

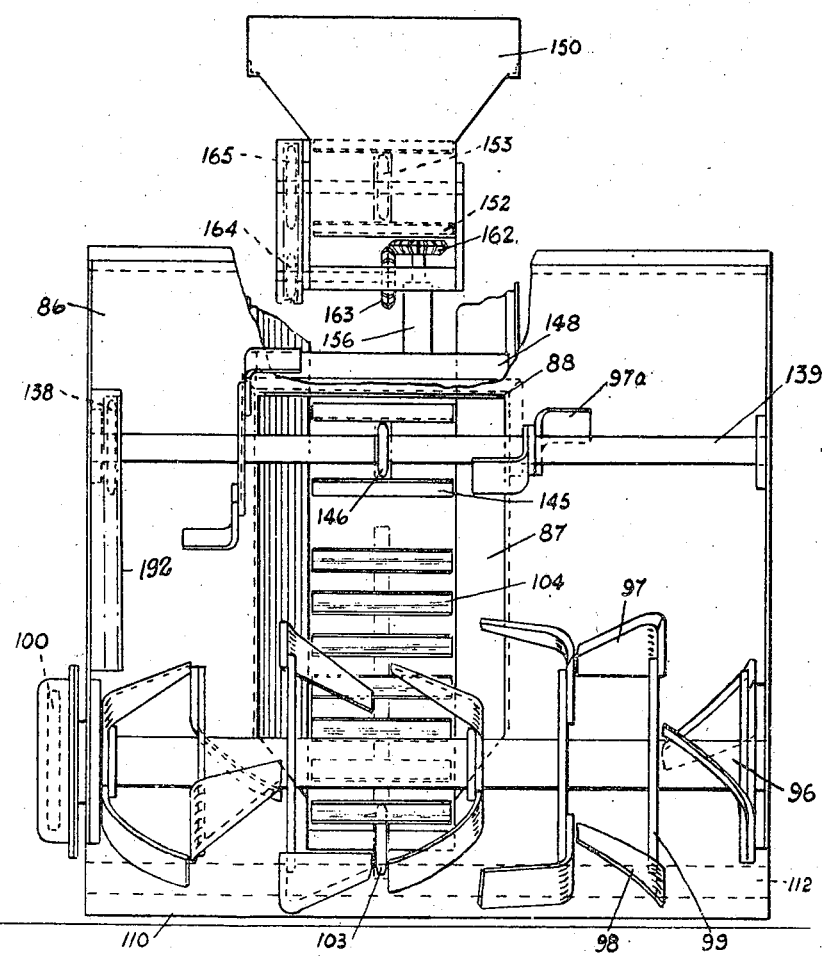
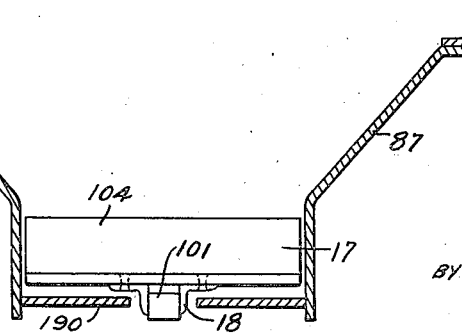

April 19, 1949. E. N. GRIFFITH ET AL 2,467,619
SOIL AND LIKE CUTTING AND LIFTING MACHINE
Filed Dec. 7, 1944 6 Sheets-Sheet 6
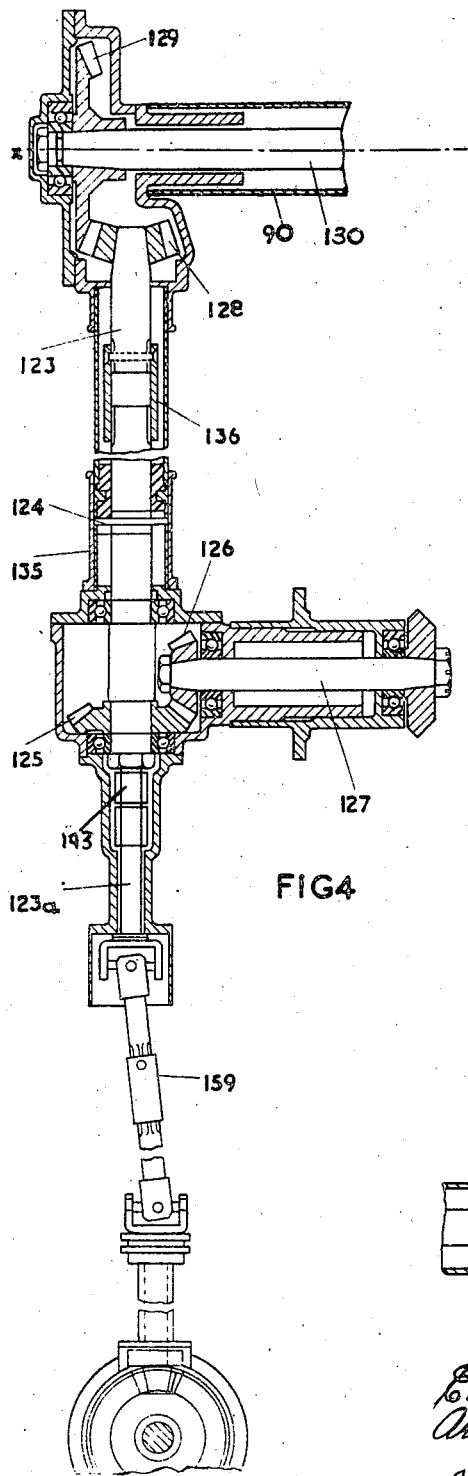
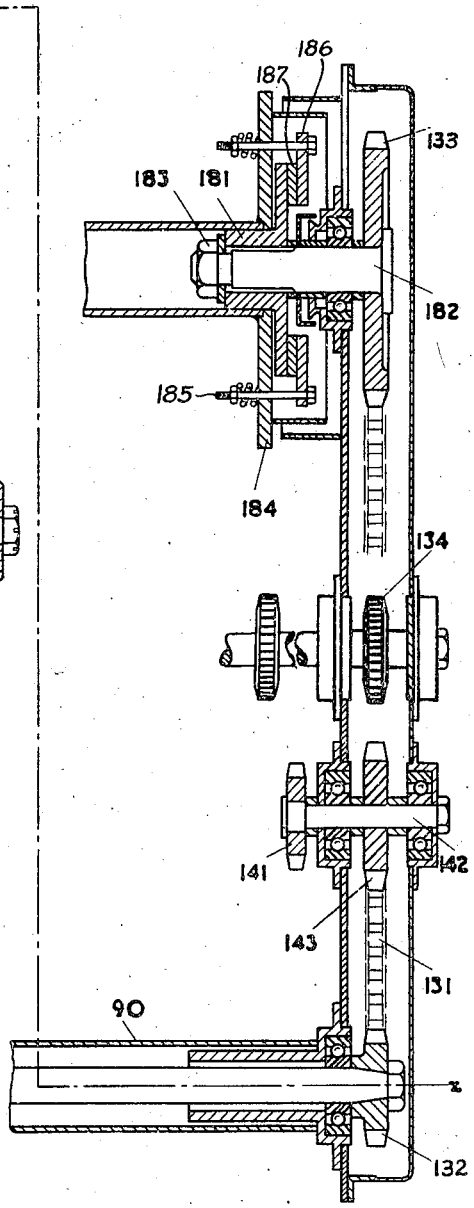
FIG 4
Edward N. Griffith
Arthur C. Howard
By Jewett & Mead Attorneys Patented Apr. 19, 1949

2,467,619

UNITED STATES PATENT OFFICE 2,467,619

SOIL AND LIKE CUTTING AND LIFTING MACHINE

Edward Noel Griffith, Little Hallingbury Park, and Arthur Clifford Howard, Upminster, England Application December 7, 1944, Serial No. 566,992
In Great Britain September 13, 1943

1 Claim. (Cl. 37—190)

This invention relates to soil and like cutting and lifting machines, and has for its object to provide a power-operated machine that will cut soil, compacted manure, certain minerals, and the like; that will break up the material so cut; and that will lift it to a convenient position for loading on to a lorry or the like.

A machine according to this invention comprises a rotary cutter and a conveyor, both mounted on a tractor and having gearing through which the cutter, the conveyor, and the machine as a whole, can be driven.

Conveniently, the tractor is one provided with a reduction gear, and the cutter, the conveyor, and associated mechanism, can be detachably secured to it. The disposition of the components is such that the front of the machine is at the rear of the tractor, which latter is adapted to be driven in reverse during normal operation of the machine.

The rotary cutter may consist of a shaft carrying one or more cutting tools adapted, in addition, to feed the material cut from both ends of the shaft towards the centre, and to throw it on to the conveyor.

In instances where the entrance to the conveyor trough is through a throat, a secondary endless conveyor chain with transverse blades is preferably disposed in the top of the throat so as to prevent said throat from being choked with the material being operated upon.

When a machine according to this invention is designed for use on high heaps of material to be cut and conveyed, a secondary rotary cutter may be journalled above the main one and be supported and driven in any suitable manner.

In some cases, a horizontally swinging delivery chute may be pivoted beneath the delivery end of the conveyor so as to enable the material being operated upon to be uniformly loaded into a lorry without it being necessary to move the lorry or to manhandle the material after loading.

In order that the present invention may be clearly understood, it will now be more particularly described with reference to the accompanying drawings which illustrate an embodiment of the invention particularly adapted for clearing the compacted accretions of farmyard manure from byres and stables and for loading them on to lorries or the like.

Of these drawings,

Fig. 1A is a side elevation of the front end of the machine,

Fig. 1B is a side elevation of the rear of the machine (Figs. 1A and 1B together showing a side elevation of the complete machine), Figs. 2A and 2B are, respectively, plan views corresponding with Figs. 1A and 1B, Fig. 3 is an end view, from the left of Fig. 1A, showing the arrangement of the rotary cutters and conveyors, Fig. 4 is a detail sectional elevation of the drive for the rotary cutters, the conveyors, and the delivery chute, to an enlarged scale. This view has been broken for the convenience of illustration, the break being indicated by the chain-dotted line X—X, and Figure 5 is a section through the trough and the upper run of the conveyor.

Referring to the drawings a tractor, indicated at 84, carries a rotary cutter 85 arranged transversely at the rear in bearings in the side walls of a housing 86. The conveyor trough 87 is secured by a laterally flared portion, or a plain wall 88, at the front of the machine to the housing 86, and a chain case 89 is secured to one side wall of said housing. A transverse tube 90, fast with the chain case 89 and which contains a transverse drive shaft thereinafter described, is connected pivotally by arms 91 and 92 to the tractor, the connection being to the legs of substantially Y-shaped plates 93 and 94 secured to the tractor rear axle casing. The rear of the trough 87 is pivotally supported on struts 95 at the front of the tractor, there being sufficient clearance at the pivots to permit of the pivotal movement taking place.

The rotary cutter 85, which comprises a shaft 96 carrying substantially L-shaped cutting tools 97 and sweeping tools 98 in pairs, is connected to be driven so that the tools, when viewed from above, move forwardly from the machine and downwardly through the layer of material being operated upon. The tools 97 and 98 are formed from metal plate, bent to the required shape, and secured to the shaft 96 by being bolted to arms 99 welded to the latter. Both these types of blade have the lateral arm of the L extending at an angle to the plane containing the axis of said shaft, as shown, so that the elbow of the L is in the lead. The leading edge of the tools 97 form their cutting edges and are further from the axis of the shaft 96 than their trailing edges so as to provide clearance for the latter, whilst the tools 98 are arranged so as to present a side surface to the material to be swept. As shown, the pairs of tools 97 and 98 are arranged in oppositely directed helices proceeding from opposite ends of the shaft 96, and the tool 97 of each pair projects radially beyond the tool 98 by an amount equal to half the forward travel of the machine during one complete rotation of the rotor; there being 180 degrees between each cutting tool and its associated sweeping tool. In this way, the tools 97 cut progressively from the elbow of the L, and both the tail of the cutting tool and the whole of the lateral arm of the sweeping tool move the cut material towards the centre of the shaft; the sweeping tools, and to some measure the cutting tools, throwing the cut material on to the conveyor.

Obviously, instead of there being one helix of each of the tools 97 and 98 at each end of the shaft 96, there could be more of either, or both, of them.

The ends of the shaft 96 are received in bearings in the side walls of the housing 86, and one end, the upper one shown in Fig. 2A, projects into the chain case 89 in which it is provided with a chain sprocket 100.

The conveyor consists of an endless chain, indicated at 101, trained about upper and lower sprockets 102 and 103, and provided with transverse blades 104 at equal intervals along its length. The upper run of the chain is in a slot in a partition 190 of the trough 87 and a portion of the latter, above the partition is completely compartmented by the conveyor blades 104, see Fig. 5, the trough above this level having outwardly sloping sides. The lower run of the chain is enclosed between the bottom of the partition mentioned above and a floor secured to the conveyor chute, so that any material falling through the slot in the partition is collected and swept by the blades 104 down to the bottom of the conveyor from whence they are picked up again. The upper sprocket 102 of the conveyor is supported in bearings formed in blocks 105, slidable in slots 106 in the side walls of the chute 87, and urged by a spring-loaded push rod 107, held in a guide 108 on said trough, in the direction to take up slackness in the chain. A nut and lock-nut, indicated at 109, enable the effort of the spring to be adjusted so that the sprocket 102 floats during operation.

The lower end of the housing 86 is provided with a scraper 110, consisting of a renewable steel strip bolted to a register bar 111 welded to a box girder 112 secured to said housing across the width of the machine.

A depth control skid 113, one of which may be disposed at each side of the machine, is pivoted at its forward end to the scraper support, and pivoted at the rear to the lower end of a long nut 114 which receives a screwed rod 115 supported in a bracket 116 on the housing 86. The rod 115 has a locating collar at each side of the bracket 116, and a crank handle at the top. The arrangement is such that upon turning the handles, the skids are turned about their pivotal connection to the scraper support, independently, and ensure an even bearing of the machine on the ground at the requisite height for operating on the material to be cut and lifted.

To facilitate transport, and in some instances as an alternative to the depth control means described in the previous paragraph, a lifting device is provided. This device comprises a long nut 117 pivoted to the tractor gear case 84, and receiving a screwed rod 118 having a crank handle at the top. This rod passes through a trunnion bearing 119 at the top of an upright 120 secured to the arm 91 by which the machine is pivotally attached to the tractor. The rod 118 has a thrust collar 121, and the upright 120 is stayed by a strut 122 to the arm 91. When the handle is turned, the rod 118 screws into the nut 117 and raises the housing 86, together with the rotary cutter and conveyor, clear of the ground. During this lifting movement, the rear of the conveyor, that is, the upper end, is permitted to make its complementary movement by reason of the pivoted struts 95. When the lifting device is used as an alternative for the depth control mechanism, instead of as an addition thereto, the depth of operation is controlled by turning the rod 118 as will be readily understood.

The drive for the rotary cutter and conveyor comprises a longitudinal drive shaft 123 incorporating a dog clutch 124 and connected at the rear by bevel gears 125 and 126 to the tractor power take-off shaft 127. The shaft 123 carries a bevel pinion 128 at the front which is in permanent mesh with a bevel gear 129 on a transverse shaft 130 that is disposed within the transverse tube 90, which, as hereinbefore stated, is pivoted by the arms 91 and 92 to the tractor. A driving chain 131, indicated by the chain-dotted line in Fig. 4, is trained about a sprocket 132 on the shaft 130 and about a sprocket 133 on the rotary cutter shaft 96. The outer side of the lower run of the chain 131 also passes over a sprocket 134 on the spindle 194 that carries the lower sprocket 103 that engages the conveyor chain. In this way, the rotary cutter and conveyor are driven in opposite directions, the former downwardly towards the front of the machine when viewed from above so as to feed the material cut rearwardly under the cutter, and the latter upwardly so as to collect and raise the cut material.

In use, the tractor is driven slowly in reverse, and the rotary cutter works into the face of the material to be operated upon, scooping it out of the face and on to the conveyor from whence it is delivered into the lorry or the like. The scraper 110, either clears the floor on which the material has accumulated, or levels off the cut made in readiness for the next one; this being regulated by the depth control skids 113 or by the screwed rod 118 of the lifting device. When it is desired to move the machine to another site, the crank handle of the rod 118 is operated to raise the machine, and during this movement, the shaft 123 and its tubular housing 135 pivot about the axis of the tractor power take-off shaft. As the pivotal connection between the arms 91, 92 and the arms 93, 94 is not coincident with the axis of the power take-off shaft, the shaft 123 and the housing 135 include telescopic elements. For this purpose, the shaft 123 is divided into two portions, one pinned within an internally splined sleeve 136, and the other provided with splines and slidable within said sleeve during this pivoting movement. The housing 135 is formed in two parts, the adjacent end of one being slidable within the other.

Another feature of this invention is also illustrated by Figs. 1A, 1B, 2A and 2B, and this consists in the provision of an upper and additional rotary cutter 137 for use on machines especially designed for working on higher heaps of material than the machine already described with reference to those figures, enabling the material to be disposed of with fewer adjustments to the depth control setting.

The rotary cutter 137 is provided with tools which may be similar to the tools 97 for cutting the material, and may also have tools similar to the tools 98 for feeding the cut material towards the centre of the cutter; these tools are respectively designated 97a and 98a. A chain sprocket 138 is mounted on the shaft 139 of the cutter 137, and is driven by a chain 140 trained about a driving sprocket 141 secured to the outer end of a stub shaft 142 journalled in the chain case 89 and carrying a sprocket 143 within the case 89, see Fig. 4. The sprocket 143 is engaged by the chain 131 and drives the shaft 139 through the sprockets 141 and 138 and the chain 140. The shaft 139, see Figs. 2A and 3, is supported in bearings in a chain case 192 for the chain 140 at one end and in the opposite wall of the housing 86 at the other.

A further feature resides in the provision of a secondary conveyor, in instances where the portion 88 of the conveyor trough is enclosed at the top, so as to prevent the material that has been cut from choking the entrance to the main conveyor. This secondary conveyor comprises a chain 144 provided with transverse blades 145, similar to the ones 104 on the main conveyor chain 101, trained about sprockets 146 and 147. Where the machine is provided with a secondary rotary cutter 137, the sprocket 146 for driving the secondary conveyor is conveniently mounted on the secondary cutter shaft 139. When, however, such a secondary cutter is not provided, a shaft 139 supported and driven in the same way may be employed solely for driving the secondary conveyor.

When the portion 88 of the conveyor trough is enclosed at the top, and the secondary conveyor is provided, a deflector 148 is preferably disposed at the rear of the conveyor trough top so as to prevent the material being thrown upwards as it leaves the secondary conveyor.

A still further feature consists of the provision of a device for enabling the material falling from the upper and rear end of the main conveyor to be loaded uniformly into the lorry. To this end, a chute 149 is pivoted on a vertical axis at one end beneath the delivery from the conveyor trough 87; the pivoted end of the chute being closed by a wall indicated at 150, and in some cases being formed somewhat in the form of a bowl. The chute 149, which is shown broken away in the illustrations, contains an endless conveyor consisting of a chain 151, with transverse blades 152, trained about sprockets 153 and 154 on shafts journalled in the side walls of the chute. A tensioning device, not shown, similar to that for the sprocket 102, may be provided for the sprocket 154.

The chute 149 is pivoted, between arms 155, co-axially with the sprocket 153, and the arms 155 are secured to a bearing tube 156 surrounding the upper end of a vertical drive shaft 157 for the chute conveyor. The lower end of the tube 156 rests on the top of a tubular stanchion 158 supported at the front of the tractor.

Drive for the chute conveyor is from a rearward extension 123a of the main drive shaft 123, and is communicated to said conveyor by a flexible or articulated shaft 159, bevel gearing 160, 161 at the foot of the vertical drive shaft 157, and bevel gearing 162, 163 at the top of said vertical shaft; the bevel gear 163 having a sprocket 164 on its shaft connected by a chain to a sprocket 165 on the shaft of the sprocket 153. The bevel gears 162 and 163, and the sprockets 164 and 165 are preferably enclosed in a casing to exclude dirt.

An extension piece, on the bearing tube 156, is provided with a tooth 166 adapted to be engaged by one of a series of teeth on an arm 167 pivoted beneath the chute 149 so as to hold the latter in an angularly adjusted position.

The chute 149 is also provided with a laterally extending arm 168, see Fig. 2B, which has a rod 169 pivoted to it. This rod extends towards the front of the machine and terminates in a handle 170, conveniently situated for the operator, so that the chute can be swung from side to side about its vertical bearing when a lorry is being loaded.

With this construction, the main conveyor is preferably provided with a depending shield 171, whose position may be adjustable, to ensure that the material leaving it is deflected into the chute 149.

If desired, a dog clutch, indicated at 193, may be incorporated in the extension 123a of the shaft 123, so as to enable the drive to the chute conveyor to be disconnected.

When the rotary cutter and conveyor have been raised for transport from one site to another, the flexible or articulated shaft 159 (which is made telescopic for this purpose), enables the drive shaft 123 and its casing 135 to pivot about the axis of the power take-off shaft freely. Also the articulation or flexibility of said shaft 159, together with its extensible character, enable it to drive the chute conveyor without hindrance when the height of the rotary cutter has been adjusted by the depth control skids or the lifting device.

It will be understood that ball or any other bearings suitable for the specific purpose may be provided for the various sprocket shafts, and that friction or other overload clutches may be provided in the shafts subject to sudden variations in load. Such a friction clutch is shown on the rotary cutter shaft 96 in Fig. 4, and comprises a flanged collar 181 keyed or splined to a portion of a short shaft 182, carrying the sprocket 133, by a nut 183. The rotary cutter shaft 96 is formed hollow to receive the shaft 182, and has a flange 184 carrying spring-loaded bolts 185 that urge a ring 186 and friction ring 187 on to the flange of the collar 181. In this way, if the drive becomes overloaded, the sprocket is permitted to slip with respect to the shaft it drives.

We claim:

A machine for cutting and lifting soil and like material, comprising a wheeled frame; a rotary cutter shaft arranged transversely at one end of said frame; two series of radial arms arranged in diametrically opposed pairs on said shaft, and proceeding from near each end thereof towards the centre, the series of arms on opposite sides of the centre of said shaft forming helices which are opposite in direction; a cutting tool on one arm of each said pair and a sweeping tool on the other arm of each said pair, the tools being substantially L-shaped and bent from metal plate so that the arms of the L extend towards the centre of the cutter with the elbows of the L in the lead when the cutter is rotated; the cutting tools extending radially beyond the sweeping tools by an amount equal to half the forward travel of the machine during one rotation of the rotary cutter, and having their cutting edges farther from the shaft than their trailing edges so as to provide clearance for the latter; and the sweeping tools presenting a side surface to the material to be swept; the arrangement being such that the cutting tools cut progressively from the elbow to the tail, and both the tail of the cutting tools and the whole of the sweeping tools move the cut material towards the centre of the rotary cutter; a conveyor mounted on said frame and inclining from said rotary cutter to a delivery point at the end of said frame opposite to said rotary cutter; a power plant associated with said frame; and power transmission means through which the cutter, the conveyor, and the machine as a whole, can be driven from said power plant.

EDWARD NOEL GRIFFITH.
ARTHUR CLIFFORD HOWARD.

REFERENCES CITED

The following references are of record in the file of this patent:

UNITED STATES PATENTS

| Number | Name | Date |
|---|---|---|
| 1,004,616 | Aasland | Oct. 3, 1911 |
| 1,070,065 | Pfile | Aug. 12, 1913 |
| 1,148,954 | Carr | Aug. 3, 1915 |
| 1,252,164 | Peltier | Jan. 1, 1918 |
| 1,346,679 | Pratt | July 13, 1920 |
| 1,424,093 | Gilman | July 25, 1922 |
| 1,571,344 | Sanders | Feb. 2, 1926 |
| 1,662,832 | Nelson et al. | Mar. 20, 1928 |
| 1,736,661 | Muffett | Nov. 19, 1929 |
| 1,754,699 | Snyder | Apr. 15, 1930 |
| 1,764,084 | Nelson et al. | June 17, 1930 |
| 1,766,456 | Roller | June 24, 1930 |
| 1,790,810 | Haiss | Feb. 3, 1931 |
| 1,805,951 | Miller, Jr. | May 19, 1931 |
| 2,353,094 | Veneziano | July 4, 1944 |